(12) United States Patent
Subramanian et al.

(10) Patent No.: US 12,058,176 B1
(45) Date of Patent: Aug. 6, 2024

(54) IMPERSONATING REQUEST-BASED SECURITY IN CONNECTION-BASED SECURITY ENVIRONMENT

(71) Applicant: Amazon Technologies, Inc., Seattle, WA (US)

(72) Inventors: Gokul Ramanan Subramanian, Cambridge (GB); Sayantan Chakravorty, Sammamish, WA (US); Dennis Tighe, Seattle, WA (US); Carlos Alessandro Chiconato, Seattle, WA (US); Damian Wylie, Preston, WA (US)

(73) Assignee: Amazon Technologies, Inc., Seattle, WA (US)

( * ) Notice: Subject to any disclaimer, the term of this patent is extended or adjusted under 35 U.S.C. 154(b) by 863 days.

(21) Appl. No.: 17/161,491

(22) Filed: Jan. 28, 2021

(51) Int. Cl.
*H04L 29/06* (2006.01)
*H04L 9/40* (2022.01)

(52) U.S. Cl.
CPC .......... *H04L 63/20* (2013.01); *H04L 63/0807* (2013.01); *H04L 63/0876* (2013.01); *H04L 63/1483* (2013.01)

(58) Field of Classification Search
CPC . H04L 63/20; H04L 63/0807; H04L 63/0876; H04L 63/1483
See application file for complete search history.

(56) References Cited

U.S. PATENT DOCUMENTS

| | | | | |
|---|---|---|---|---|
| 9,225,744 | B1* | 12/2015 | Behm | H04L 63/20 |
| 11,399,091 | B1* | 7/2022 | Coles | G06Q 40/02 |
| 2006/0282377 | A1* | 12/2006 | Edwards | G06Q 20/2295 |
| | | | | 705/39 |
| 2012/0117634 | A1* | 5/2012 | Halls | H04L 63/0218 |
| | | | | 726/7 |
| 2020/0211016 | A1* | 7/2020 | Ju | G06Q 20/4016 |

(Continued)

OTHER PUBLICATIONS

"Apached Kafka", Retrieved from kafka.apache.org/090/documentation. html#security_sasl, Oct. 28, 2020, pp. 1-213.

(Continued)

*Primary Examiner* — Wasika Nipa
(74) *Attorney, Agent, or Firm* — Robert C. Kowert; Kowert, Hood, Munyon, Rankin & Goetzel, P.C.

(57) ABSTRACT

A connection-based service impersonates request-based security for requests from clients that do not include credentials for the requests (e.g., data plane requests made via a connection-oriented security). A connection between a client and a connection-based service is established based on connection credentials that are based on security credentials from a request-based security service. The credentials are sent by a security component of the service to a local agent of the remote security service to be authenticated by the security service. An impersonation token is returned by the security service and cached by the local agent. Requests from the client to perform operations do not include credentials. For each request, the service passes an identifier for the client and the operation to a local authorization component that calls the agent for authorization of the requested operation. The agent uses the impersonation token to obtain authorization for the requested operation.

20 Claims, 10 Drawing Sheets

(56) References Cited

U.S. PATENT DOCUMENTS

| | | | |
|---|---|---|---|
| 2020/0280855 A1* | 9/2020 | Avetisov | H04L 63/0884 |
| 2022/0005039 A1* | 1/2022 | Hires | G06Q 20/4014 |
| 2022/0103569 A1* | 3/2022 | Galloway | H04L 63/0227 |

OTHER PUBLICATIONS

Ramkishore Bhattacharyya, "How to Use Your Own Identity and Access Management Systems to Control Access to AWS IoT Resouces", AWS Security Blog, Retrieved from https://aws.amazon.com/blogs/security/how-to-use-your-pwn-identity-and-access-management-systems-to-control-access-to-aws-iot-resources/, Oct. 28, 2020, pp. 1-12.

* cited by examiner

IMPERSONATING REQUEST-BASED SECURITY IN CONNECTION-BASED SECURITY ENVIRONMENT

BACKGROUND

Clients that access a service having connection-based security may establish, based on credentials, secure connections with the service. Once a connection is established between the client and the server, numerous requests may be made for the duration of the connection without any further passing of the credentials. For example, requests and responses may be transmitted over the established connection without including credentials with each request. In contrast, clients that access a service having request-based security may be required to include credentials with each request.

Figure 1:
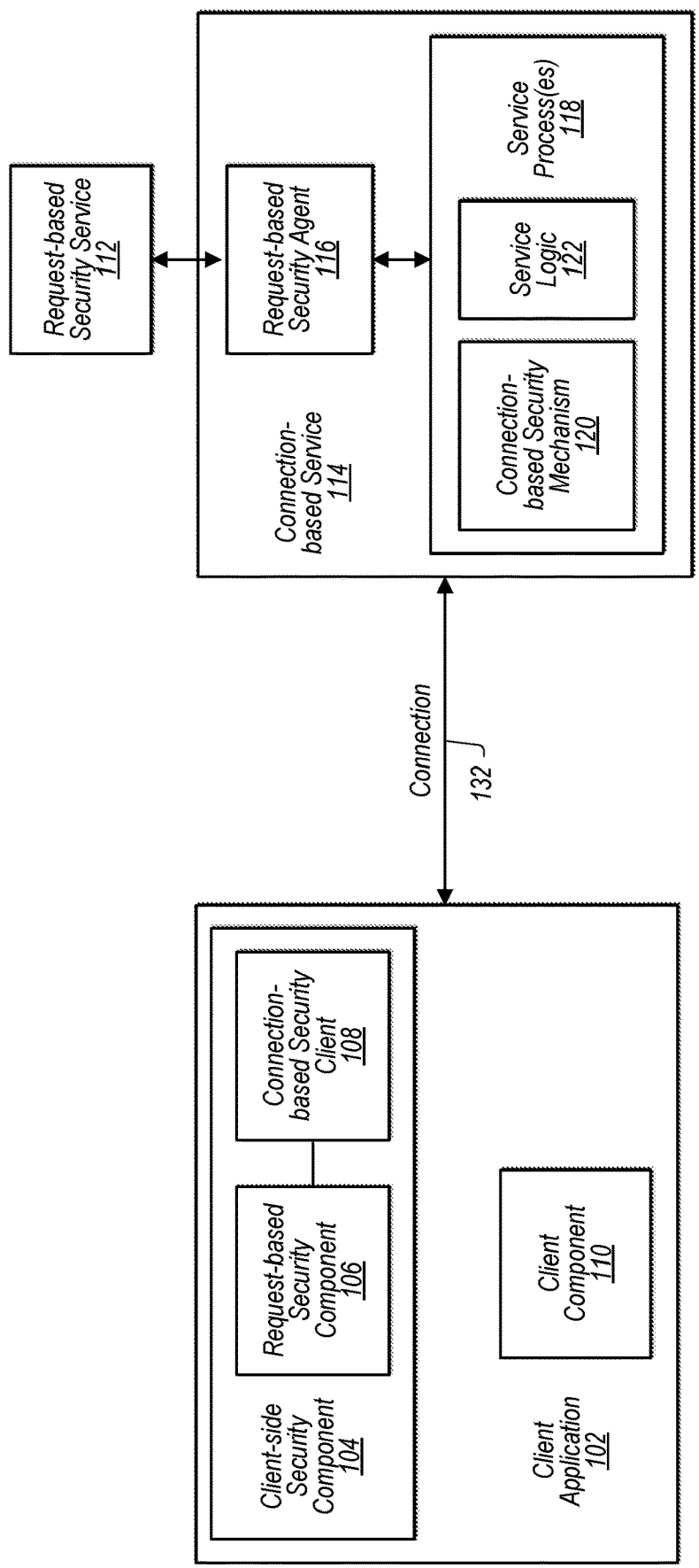
FIG. 1 is a block diagram that illustrates components of a system that implements impersonation of request-based security in a connection-based security environment, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed below, various embodiments of systems that implement impersonation of request-based security in a connection-based security environment are disclosed.

Connection-based services implement connection-based security where credentials are required to create a connection or session and request-based services implement request-based security where credentials are passed with each request. In some environments, it may be desirable to impersonate request-based security features in a connection-based security environment. Take, for example, a system architecture where a request-based service is reached by request-making clients using connection-based security. In such an architecture it may be possible to leverage an existing request-based security service for some security features (e.g., control plane operations) but implementation generally requires custom, client-level ad-hoc security software. For example, in an environment where a network-based service provider provides managed services having connection-based security as well as a request-based security service, the request-based security service is not readily usable with connection-based services having connection-based security.

In some non-preferred embodiments, ad-hoc approaches to authentication and authorization for the connection-based service operations are non-standard, and complex to understand due to lack of centralized documentation. In one example for services implemented across clusters (e.g., a logical grouping of tasks or services), the ad-hoc approaches to authentication and authorization may be harder to manage uniformly due to the authentication and authorization being tied to the cluster. For example, a customer could adopt a two-pronged approach to identity and access management for a connection-based service hosted across clusters. Firstly, they could manage authorization for all the control plane operations such as creating a cluster, enabling monitoring on the cluster, deleting a cluster, scaling out the cluster, upgrading the cluster and others via permissions policies of an identity and access management service hosted by a service provider, similar to implementations for other services with request-based security. All applications performing these operations via the connection-based service would authenticate as identity and access management service identities. Secondly, they would manage authorization for all data plane operations for the connection-based service (again, using the managed streaming service example, such as creating topics, writing data into topics, reading data from topics, and other cluster operations) on an existing connection-based service cluster via ad-hoc Access Control Lists (ACLs) managed directly within the cluster. All applications performing these operations would authenticate as either TLS certificate based distinguished names or via username/passwords. But again, such ad-hoc approaches are non-standard, complex to understand, and for services implemented across clusters, harder to manage uniformly across multiple clusters due to being tied to a cluster.

A preferred embodiment uses an existing request-based security service (e.g., an identity and access management service) to impersonate request-based security for the connection-based service to meet demands of service logic that requires or provides features that can benefit from request-based security. In embodiments, the existing request-based security service (e.g., a service provider's identity and access management service) may be used to impersonate request-based security for the control plane and/or the data plane of the connection-based service.

In one non-limiting example of an embodiment of impersonation of request-based security in a connection-based security environment, a service provider network hosts an identity and access management service that provides request-based security for use with various request-based services also hosted by the service provider. The service provider may also host various connection-based services that are configured to work with connection-based security. In some instances, customers or clients that already make use of the service provider's identity and access management service (sometimes referred to as a request-based security service, herein) may wish to leverage the service provider's identity and access management service to provide request-based security features for a connection-based service, when service logic of the connection-based service requires or could benefit from request-based security, for example.

Benefits

Such an architecture allows service provider customers to write software applications that authenticate as identity and access management identities (e.g., users, roles, long-lived identities, short lived identities, etc.) to a service provider instance and then perform service logic operations and other (instance or cluster) operations if authorized to do so (e.g., if authorized by permissions policies that customers can define and attach to the identity). In one non-limiting example, software applications (e.g., implemented by clients of a service provider network) may authenticate as identities of an identity and access management service to a connection-based service (e.g., a managed streaming data service or the like, such as a managed Kafka cluster) and then perform operations (such as creating topics, producing data into topics, consuming data from topics and other cluster operations, continuing with—but not limited to—the streaming data service example) if authorized to do so by permissions policies of the identity and access management service that customers can define and attach to the identities.

In order to achieve authentication via an existing identity and access management service, one example technique relies upon an implementation that leverages custom features of existing frameworks for authentication and data security using Internet protocols (e.g., the Secure Authentication and Security Layer (SASL) framework, or similar). In embodiments, some of these existing frameworks enable definition of a custom mechanism for exchanging arbitrary credentials between the client application and the instance (or instances of a cluster) hosting the connection-based service.

Authentication Via an Identity and Access Management Service

Some embodiments define a new client-side mechanism such that the client application sends an authentication payload containing all the relevant identity and access management service credentials. The connection-based service that receives the credentials (e.g., via SASL) calls to the identity and access management backend service for authenticating the client application. In some embodiments (e.g., to ensure that the client application does not leak any secret information about its identity to the cluster or any attacker) the client application does not directly send all its credentials (e.g., does not send all of an access key ID, secret access key and session token). Instead, the client application may use the secret access key to generate a digital signature (e.g., based on the Signature V4 standard, or the like) and may send the signature along with the access key ID and the session token.

Authorizing the Client Application for Data Plane Operations

Some embodiments use impersonation credentials (e.g., an impersonation token or the like) to impersonate request-based security features. For example, when a client application creates a TCP connection to the instance (or cluster) hosting the connection-based service and authenticates itself (e.g., as described above), a request-based security agent implemented on the instance or cluster will fetch and store (e.g., cache) an impersonation credential from the identity and access management backend service that can be used to perform operations on behalf of the client application. Subsequently, when the client application requests a data plane operation on the same TCP connection, although the request is not accompanied with any authentication credentials, a connection-based security mechanism will use the impersonation credential already acquired to impersonate the client application, and authorize it for the specific data plane operation requested.

Isolation of Security Mechanisms

In some embodiments (e.g., in order to ensure security of the instance or cluster) one or more of the components of the connection-based service, such as—but not limited to—the request-based security agent executing on the instance that invokes authentication and authorization functionalities of the identity and access management backend, is isolated into a separate process (e.g., isolated into a separate Linux process or the like). The execution of the request-based security agent may be separated from the service process that is at the core of the instance or cluster, but which is nevertheless running third-party software vulnerable to malicious/inadvertent tampering (however unlikely).

The request-based security agent process(es) and the service process(es) run on the same instance, but as separate processes, in embodiments. In some embodiments, authentication and authorization shim components are plugged into the service process that invokes the request-based security agent. In embodiments, performance is enhanced by ensuring that all inter-process communication is within the instance, and/or through the use of authorization caches.

Libraries

In some embodiments, client applications download (e.g., from a service provider network) and link a library (e.g., a JVM compatible library or similar) used to send aforementioned credentials to the instance or cluster for authentication purposes. Customer applications that want to connect to a service provider instance or cluster and leverage an existing identity and access management service link their application against this library, in embodiments.

In embodiments, the data plane being accessed is third-party application software that is not easily integrated with the request-based security service (e.g., an identity and access management service) although the control plane may be readily integrated with the request-based security service (e.g., an identity and access management service).

Figure 2:
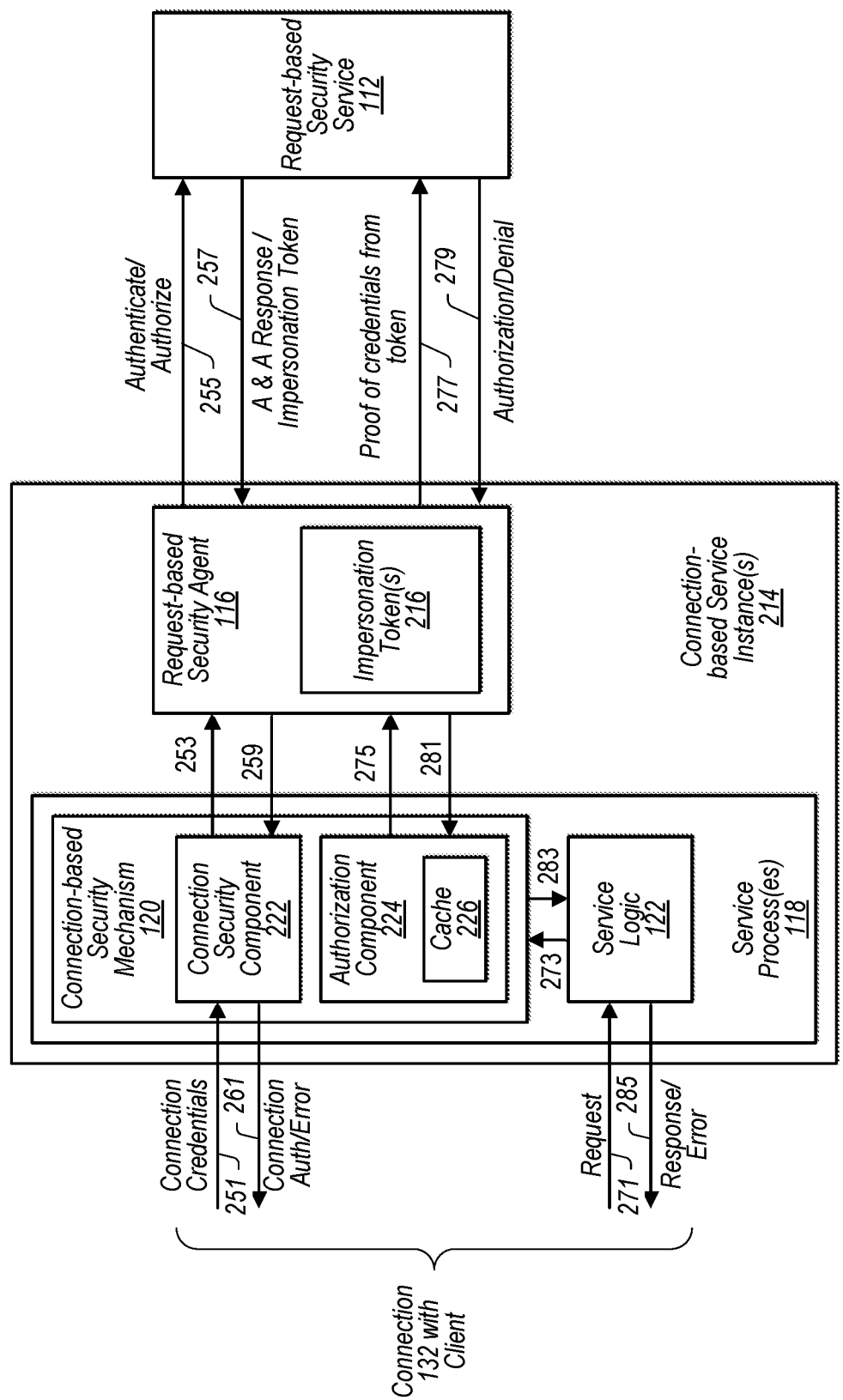
FIG. 2 is combined block diagram/data flow diagrams illustrating architectures and data flows for the service side of impersonation of request-based security in a connection-based security environment, according to some embodiments.
Figure 3:
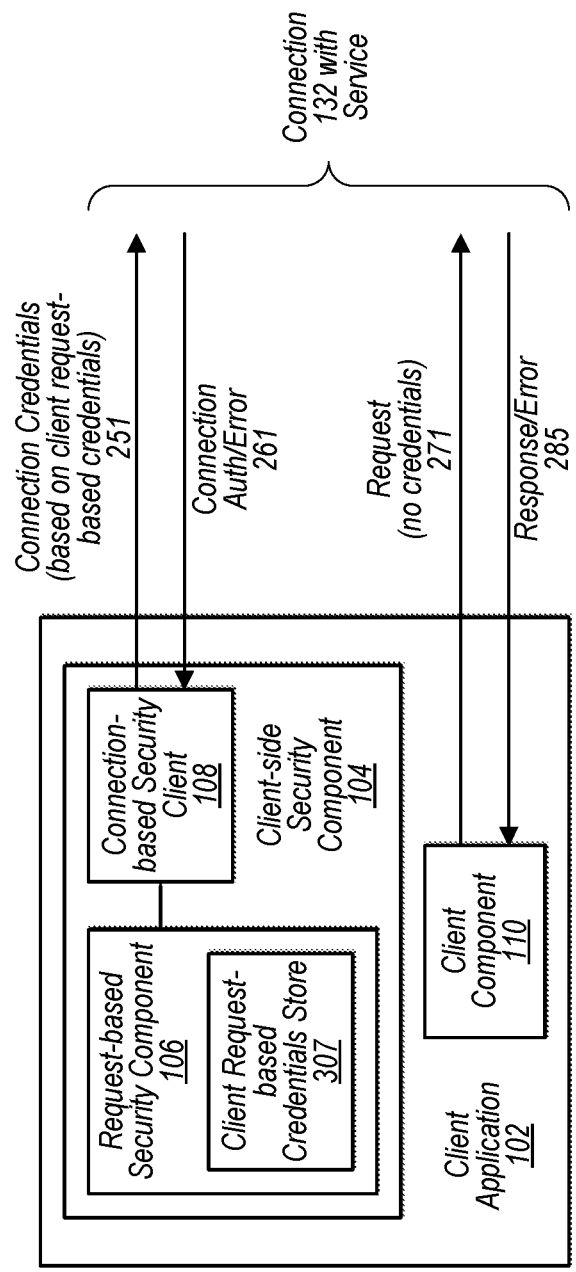
FIG. 3 is combined block diagram/data flow diagrams illustrating architectures and data flows for the client side of impersonation of request-based security in a connection-based security environment, according to some embodiments.
Figure 8:
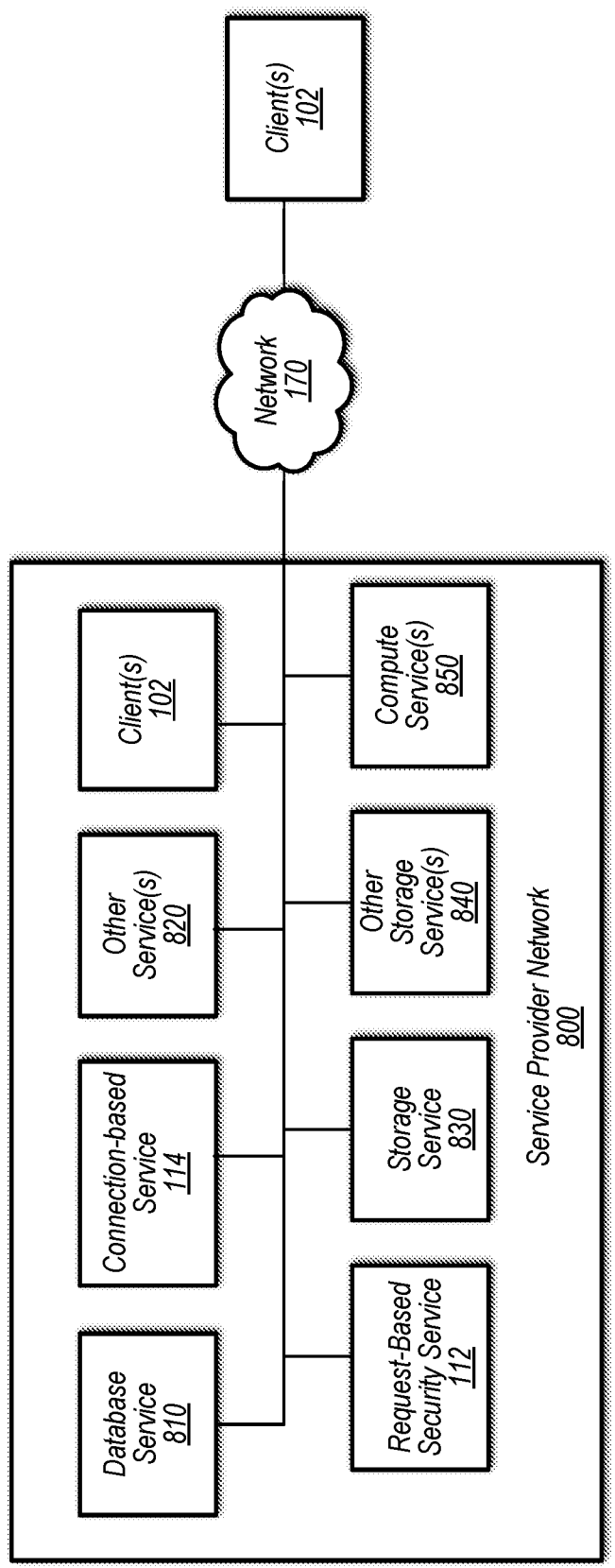
FIG. 8 is a block diagram that illustrates components of a service provider network that hosts request-based services with request-based security and a connection-based service that implements request-based security of a request-based security service that is also hosted by the service provide network, according to some embodiments.
Figure 9:
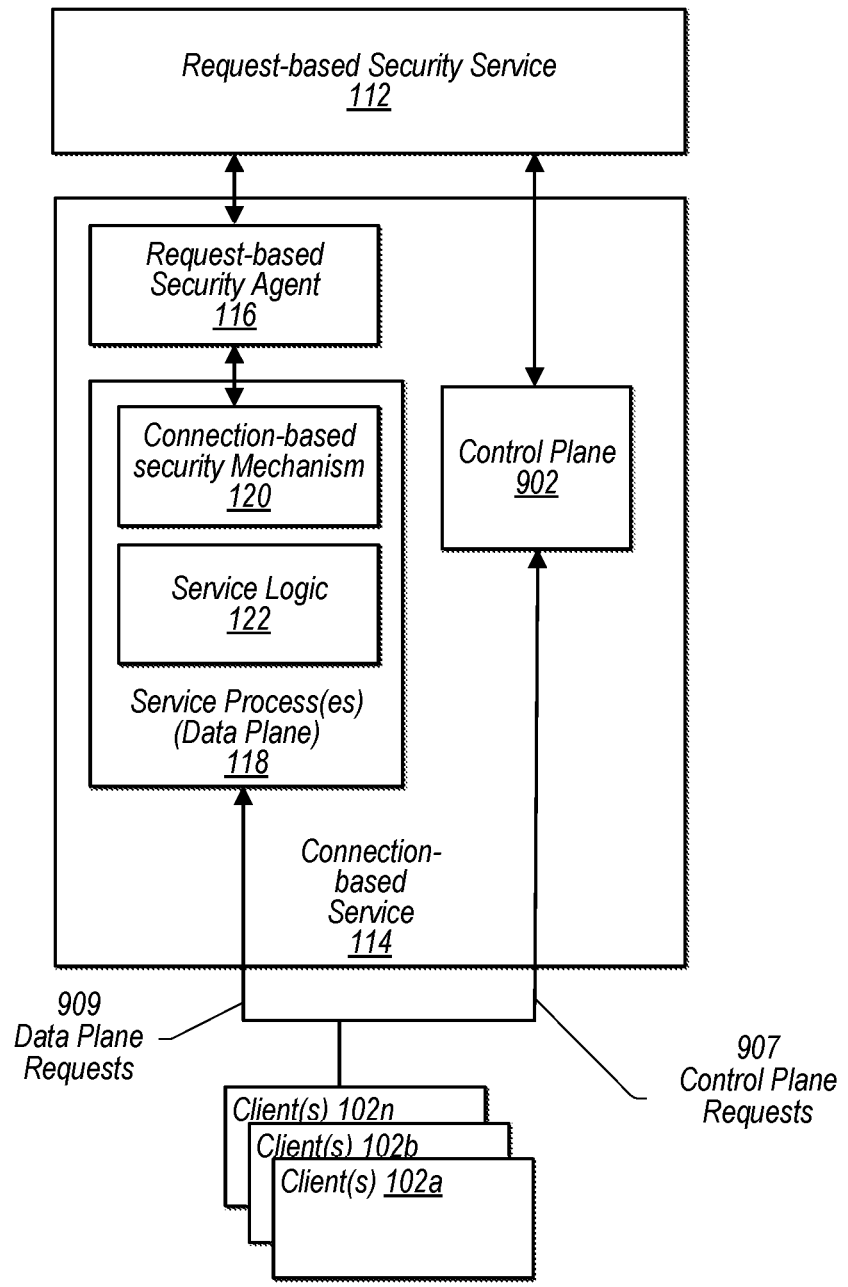
FIG. 9 is a block diagram that illustrates a control plane, separate a data plane, of a connection-based service that implements request-based security, according to some embodiments.
Figure 10:
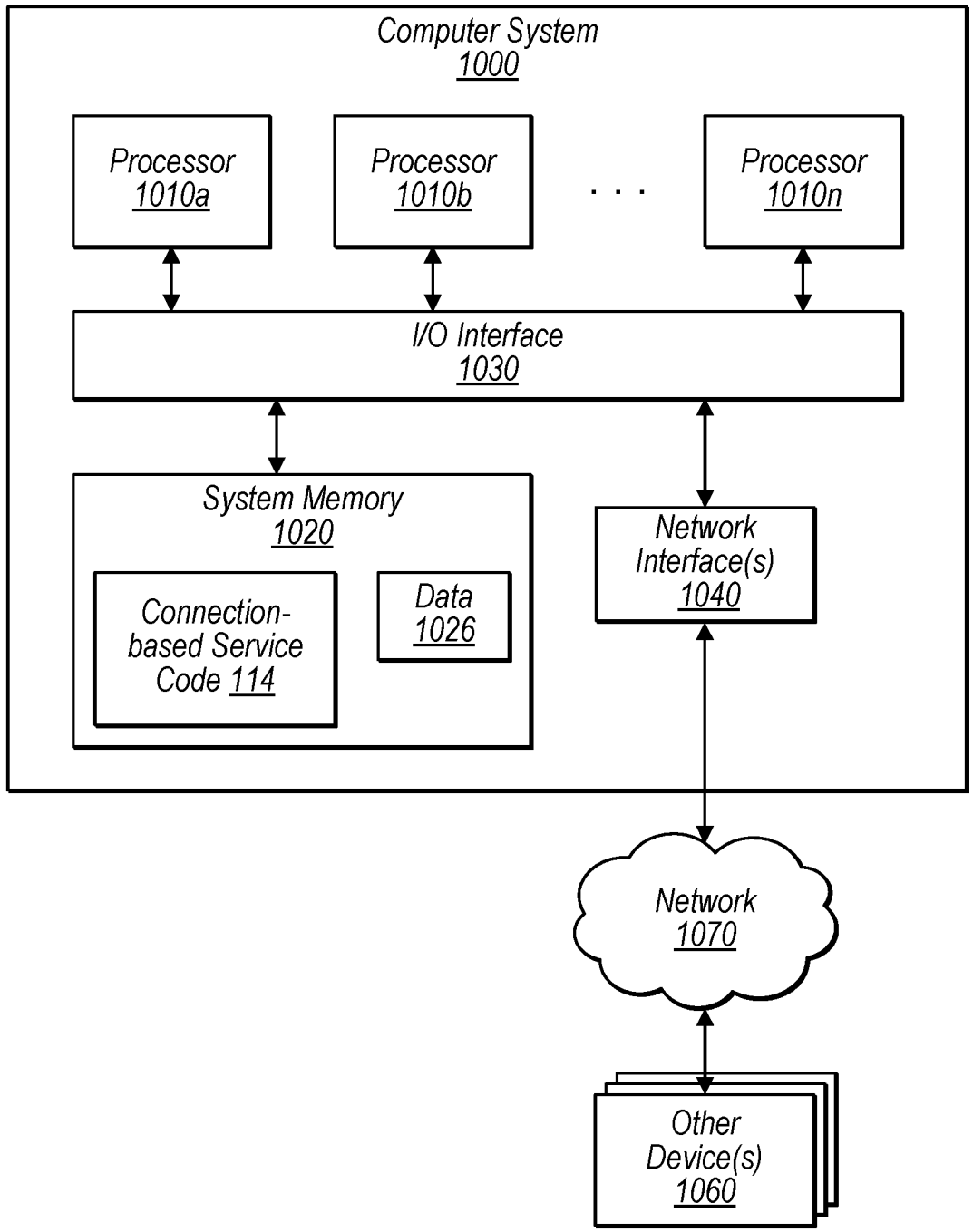
FIG. 10 is a block diagram illustrating a computer system configured to implement at least a portion of a system that implements impersonation of request-based security in a connection-based security environment, according to various embodiments.

Embodiments of impersonating request-based security in connection-based security environment will now be described in various Figures depicting system components, data flows and system processes. FIGS. 1, 8 and 10 are block diagrams illustrating components of a system that perform functionality depicted in FIGS. 4-7, functionality associated with impersonating request-based security in a connection-based security environment. FIGS. 2, 3 and 9 are combination block diagram/data flow diagrams that illustrate movement of data among the components depicted in FIGS. 1, 8 and 10 according to some of the functionality illustrated in in FIGS. 4-7. For example, the functionality depicted in FIG. 4 may be performed by the client components of system that impersonates request-based security in connection-based security environment illustrated in FIG. 3 and the functionality depicted in FIGS. 5-7 may be performed by components illustrated in the server side, illustrated in FIGS. 1, 2 and 9, in embodiments. The FIGS. are illustrative and non-limiting. For example, it is contemplated that architectures with more, fewer or different components may perform the functionality described herein for impersonating request-based security in a connection-based security environment, that data flows may be arranged in different combinations, and that the described functionality may be performed in different orders, without departing from the scope of the invention.

Figure 4:
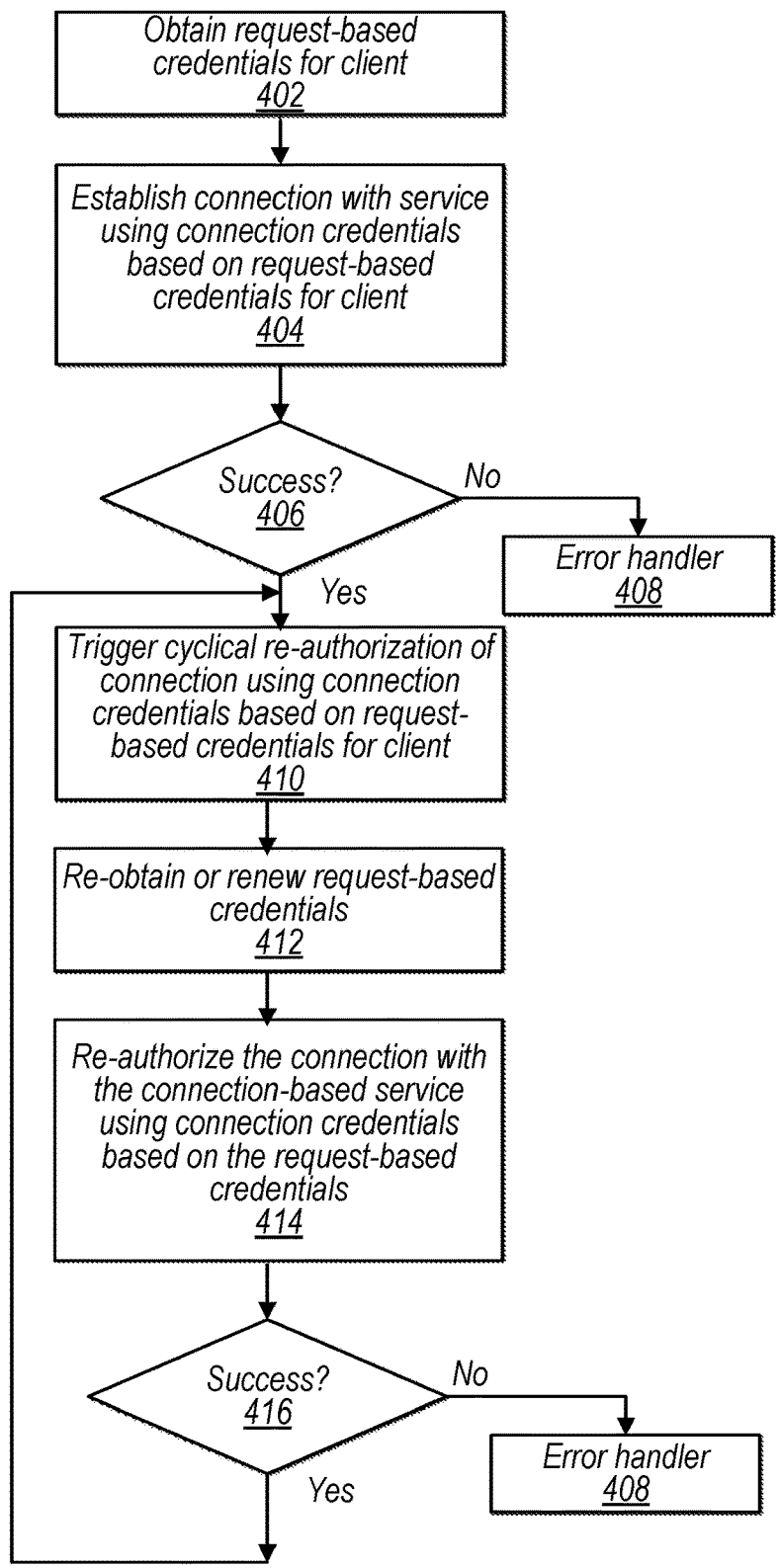
FIG. 4 is a flow chart that illustrates a technique for establishing and reauthorizing a connection between a client and a system that implements impersonation of request-based security in a connection-based security environment, according to some embodiments.

FIG. 1 is a block diagram that illustrates components of a system that implements request-based security in a connection-based security environment, according to some embodiments. Client Application 102 (also depicted in FIGS. 3, 8 and 9) has established a connection 132 (also depicted in FIGS. 3, 8 and 9) with Connection-based Service 114 (also depicted in FIGS. 2, 8, 9 and 10). FIG. 4, described below, illustrates an example process for establishing the connection, in some embodiments.

Generally, Client Component 110 of client application 102 is to send requests (e.g., requests to perform data plane operations or the like) over connection 132 to Service Logic 122 of Service Process(es) 118 of Connection-based Service 114. As explained above, Connection-based Service 114 generally interacts with Client Application 102 using connection-based security components that establish a connection (using credentials supplied by the Client-side Security Component). However, it may be desirable to also support request-based security features at the Connection-based Service 114. For example, the finer granularity of the request-based security allows software applications to authenticate as identity and access management identities (users, roles etc.) to a service instance or cluster and then perform data plane operations if authorized to do so by identity and access management permissions policies that customers can define and attach to the identity.

Request-based security component 106 may obtain credentials for the requesting client (e.g., credentials managed by an identity and access management service for an application or user, etc.). For example, the Request-based Security Component 106 includes logic that gets credentials from or that are proved by the request-based security service 112 and stores the credential on client side. The Connection-based Security Client 108 may use the credentials to establish the connection with the Connection-based Service 114 (the credentials managed by an identity and access management service may be used as credentials for establishing the connection and get passed to the Connection-based Security Mechanism 120). Once the Client-side Security Components 104 have established the Connection 132 using the credentials, the Client Component 110 may transmit operation requests over the Connection 132.

Components of the Connection-based Service 114 also establish the Connection 132 with the Client Application 102, for example, the Connection-based Security Mechanism 120 of the Service Process(es) may work in conjunction with the Request-based Security Agent 116 to validate the credentials with the Request-based Security Service 112 to authorize the Connection 132 (Illustrated in FIGS. 3 and 4). As part of the connection authorization (or separate from, in some embodiments) the Request-based Security Agent 116 may obtain an impersonation credential on behalf of the Client Application 102, which is cached locally (Illustrated in FIG. 6). The impersonation token may be used later to impersonate request-based security for individual requests that are transmitted over the established Connection 132 (e.g., data plane or control plane requests) (Illustrated in FIGS. 3, 5 and 7).

Service Side

FIG. 2 is combined block diagram/data flow diagram illustrating architectures and data flows for the service side of impersonation of request-based security in a connection-based security environment, according to some embodiments. FIG. 2 illustrates that Connection-based Service 114 may be hosted on one or more Connection-based Service Instances 214 (e.g., a cluster of instances hosted on one or more Computer Systems 1000 in FIG. 10), in embodiments. The data flows 251-261 (the odd numbers) in FIG. 2 correspond to at least some of the functionality illustrated in FIGS. 4, 5, and 6, in embodiments. Data flows 271-285 (the odd numbers) correspond to at least some of the functionality illustrated in FIGS. 5, 7, and 9 in embodiments.

Figure 5:
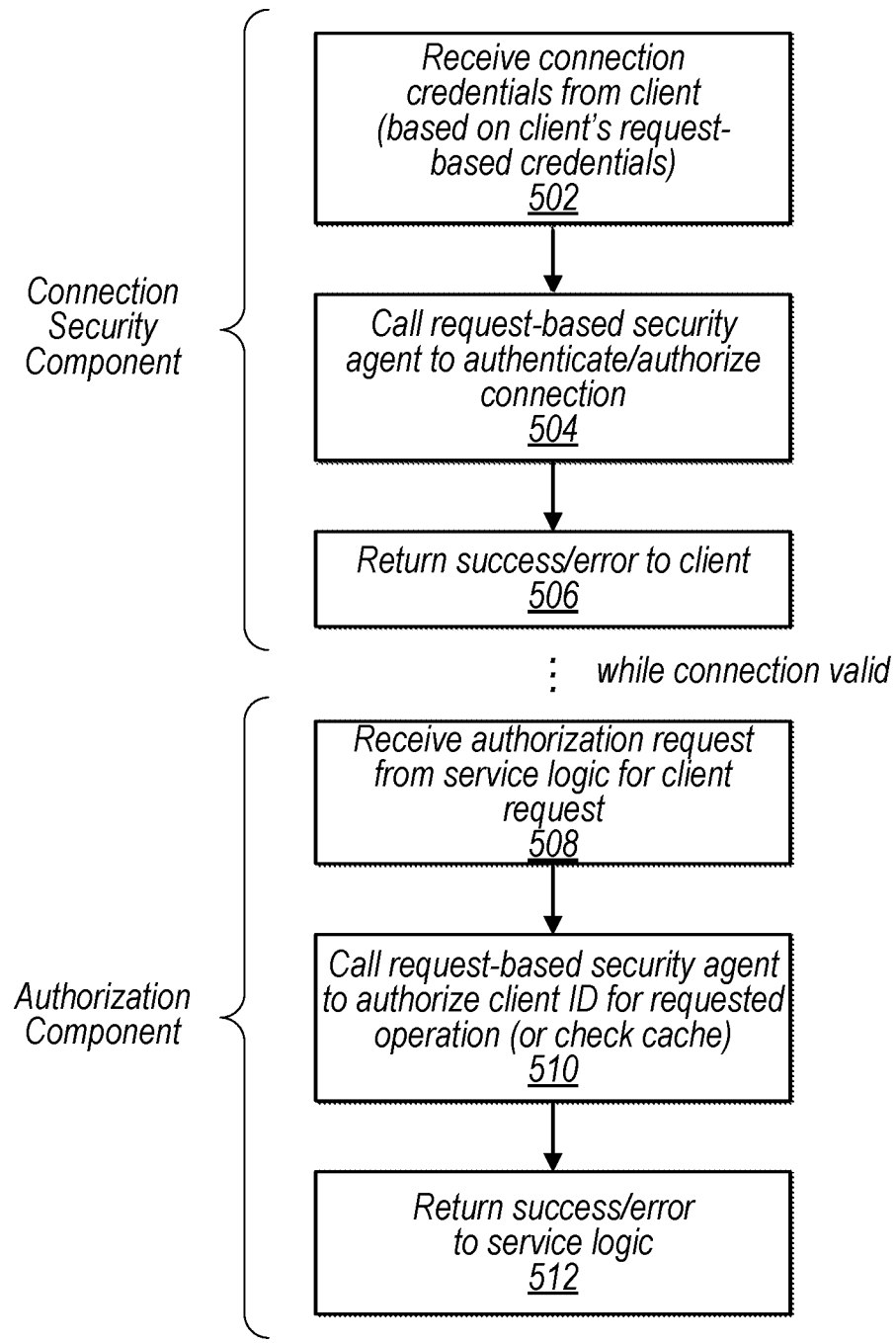
FIG. 5 is a flow chart that illustrates a technique for integrating request-based security in a connection-based security environment, according to some embodiments.

FIG. 5 is a flow chart that illustrates a technique for integrating request-based security in a connection-based security environment, according to some embodiments. FIG. 2 is described in the context of FIG. 5, in the following example embodiment.

Blocks 502-506 in FIG. 5 correspond to Data flows 251, 253, 259 and 261 in FIG. 2, in embodiments. Item 251 in FIG. 2 illustrates Connection Security Component 222 receiving connection credentials (based on the client's request-based credentials) from client application 102 via connection 132 (FIG. 5, block 502). The client's request-based credentials, used for connection credentials at 251, may be managed by an identity and access management service, in embodiments.

Item 253 illustrates Connection Security Component 222 calling the Request-based Security Agent 116 to authenticate/authorize the connection 132 (FIG. 5, block 504). The Connection Security Component 222 receives back an indication of authorization (or denial) from the agent (block 259) and returns an indication of success or error to the client application 102 (block 506). For a valid connection 132, the client may make requests to the Service Logic 122 (e.g., blocks 508-512, corresponding to items 273, 275, 281 and 283).

The ellipsis next to the text "while connection valid" indicates that time may pass between block 506 and block 508 and/or that blocks 502-506 are elements dealing with setup of the connection, while blocks 508-512 deal with use of the connection that has been setup. Blocks 502-506 may be repeated to setup connections between the service and various different clients. Blocks 508-512 may be repeated for sending numerous calls over a single connection, in embodiments.

Figure 6:
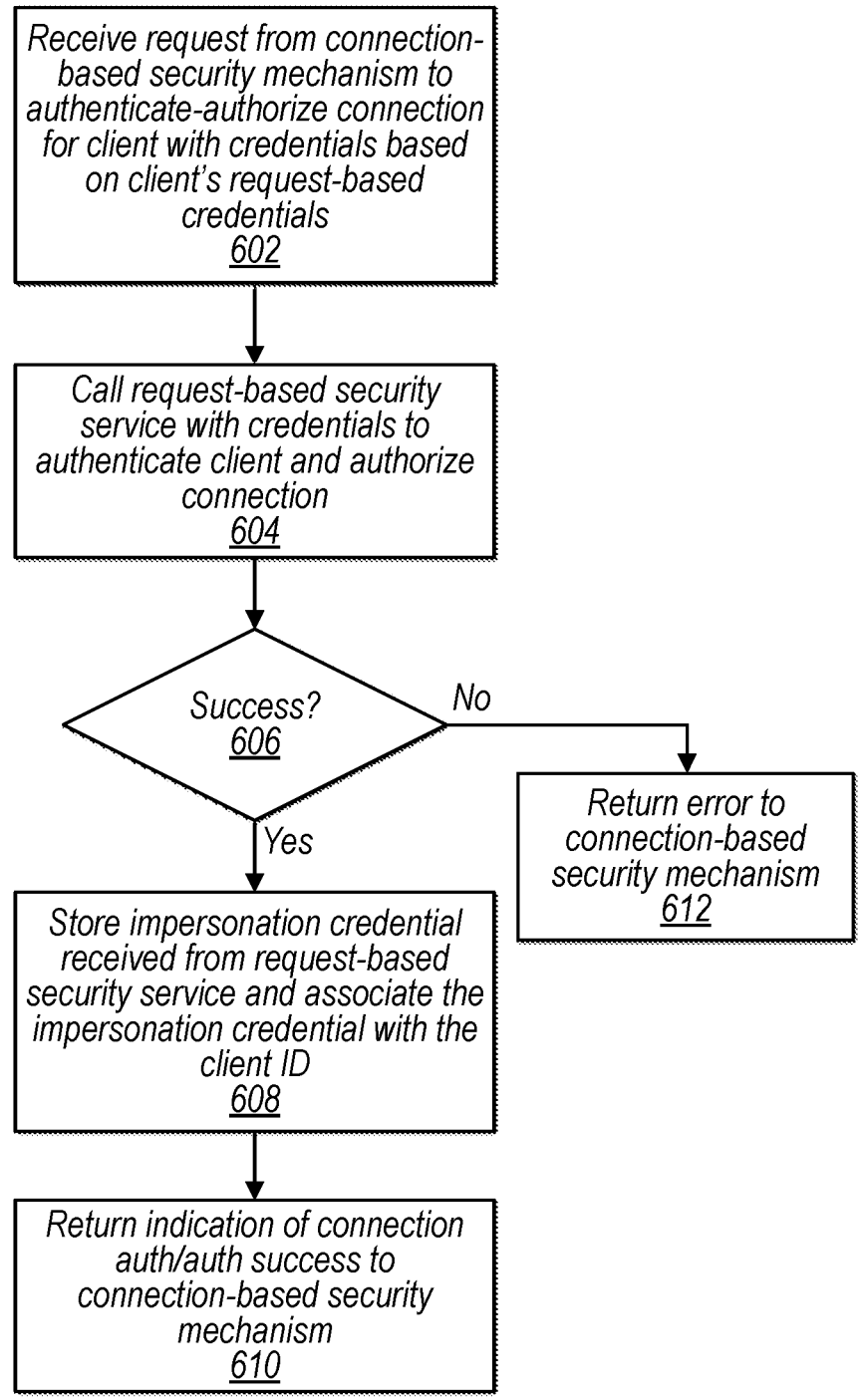
FIG. 6 is a flow chart that illustrates a technique for preparing a connection-based service to impersonate request-based security, according to some embodiments.

FIG. 2 is now described within the context of the process illustrated in FIG. 6. FIG. 6 is a flow chart that illustrates a technique for preparing a connection-based service to impersonate request-based security, according to some embodiments. For example, the illustrated process leverages the use of the request-based security credentials transported via the connection setup process to obtain and locally store an impersonation credential from the Request-based Security Service 112 that can be used to authorize operations received by Service Logic 122 (illustrated in FIG. 7, described below).

Item 253 in FIG. 2 illustrates that Request-based Security Agent 116 receives a request from Connection-based Security Mechanism 120 to authenticate-authorize a connection for a client with credentials based on the client's request-based credentials (FIG. 6, block 602).

In embodiments, Agent 116 uses the client id to look up the corresponding impersonation token in token table 216 to get credentials, and then uses the credentials from the impersonation token to checks with Request-based Security Service (112) for permissions. For example, at item 255, Request-based Security Agent 116 calls the Request-based Security Service (e.g., an identity and access management service of a service provider or the like) with the credentials to authenticate the client and authorize the connection (FIG. 6, block 604). Item 257 illustrates a response indicating success/error (FIG. 6, block 606) is received by the Request-based Security Agent 116 and that a response indicating success may include an impersonation credential (e.g., an impersonation token). If there is an error (block 606, no) the Request-based Security Agent 116 returns an error to the Connection-based Security Mechanism 120 (block 612). Otherwise, the Request-based Security Agent 116 stores the impersonation credential, received from the Request-based Security Service 112, and associates the impersonation credential with corresponding client ID (block 608). For example, the Request-based Security Agent 116 stores the impersonation credential in local storage (e.g., a cache or the like) of Impersonation Token(s) 216. Item 281 illustrates that Request-based Security Agent 116 returns an indication of the connection authentication/authorization success to the Connection-based Security Mechanism 120 (block 610). The Connection-based Security Mechanism 120 may pass along the indication to the client (e.g., item 261), establishing the connection for a successful auth/auth, in embodiments. In embodiments, blocks 608 and 610 may performed in reverse order.

Reference is now made to the bottom half of FIG. 5, which illustrates authorization of a request (e.g., a request to perform an operation at Service Logic 122) from the client, received over the connection 132. In embodiments, Service Logic 122 tells Authorization Component 224 the client ID for that connection on which it received the request. For example, item 273 in FIG. 2 illustrates that an Authorization Component 224 receives an authorization request from Service Logic 122 for a client request 271 (FIG. 5, block 508). In embodiments, the Service Logic 122 has a request to authorize, but no credentials with the request. Because the Connection-based Security Mechanism 120 knows the client and the request a (e.g., API call) the Connection-based Security Mechanism can ask the Request-based Security Agent 116 if client is permitted to do requested action (requested API call).

Item 275 illustrates that Authorization Component 224 calls Request-based Security Agent 116 to authorize the client ID for the requested operation (e.g., or by checking in cache 226) (FIG. 5, block 510). Cache 226 may store permissions obtained using the impersonation token at security service 112. In embodiments, a component of the Connection-based Security Mechanism 120 may create and store a binding of the connection to a particular client Id (an identity and access management identity, in some embodiments). The binding (e.g., a mapping) may be used by components of the Connection-based Security Mechanism 120 to determine a client identity associated with a request received over a corresponding connection. In embodiments, the binding (storage of a mapping) may be performed during establishment of the connection (e.g., during the above-described SASL-based establishment of the connection). In the SASL example, SASL authentication consists of the client and the server exchanging SASL messages embedded inside LDAP "bind" requests and responses. The "bind" request contains a name field, which indicates an ID that the client wishes to authenticate as. The ID may be an identity managed by an identity and access management service, in embodiments. Service Logic 122 or Authorization Component 224 may store the binding and use the mapping to identify the client based on which connection the request was received, in embodiments.

The Authorization Component 224 returns indication of success or error of the requested authorization to the Service Logic 122 (FIG. 5, block 512). The Service Logic may or may not perform the requested operation, determined on whether the authorization was a success or error and return a response acknowledging the success or the operation or authorization error, in embodiments.

Figure 7:
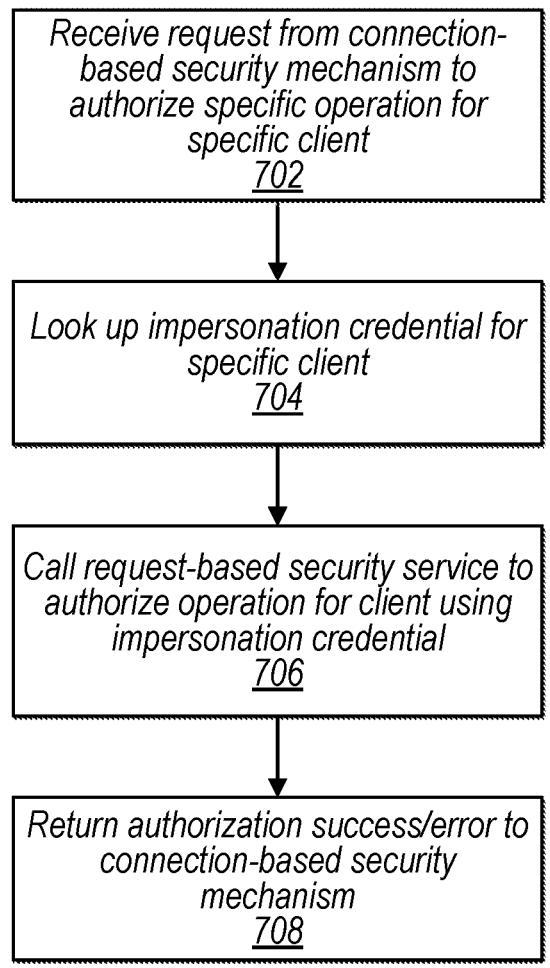
FIG. 7 is a flow chart that illustrates a technique for using impersonation credentials to impersonate request-based security for operations performed by the connection-based service, according to some embodiments.

FIG. 2 is now described in the context of the process illustrated in FIG. 7. FIG. 7 is a flow chart that illustrates a technique for using impersonation credentials to impersonate request-based security for operations performed by the connection-based service, according to some embodiments. FIG. 7 illustrates use of the connection and impersonation credential established in FIGS. 4, 5 and 6 to impersonate request-based security for requested operations at the Service Logic 122, in embodiments.

Item 275 in FIG. 2 illustrates that Request-based Security Agent 116 receives a request from Connection-based Security Mechanism 120 (e.g., Authorization Component 224) to authorize a specific operation for a specific client (FIG. 7, block 702). The Request-based Security Agent 116 looks up the impersonation credential for the specific client (e.g., in a table or other data store of mappings of clients to impersonation credentials 216) (FIG. 7, block 704). Item 277 illustrates that Request-based Security Agent 116 calls the Request-based Security Service 112 to authorize the requested operation for the client using the impersonation credential (block 706).

In some embodiments (e.g., to ensure that secret identity information is not leaked to the instance, cluster or attacker, etc.) the Request-based Security Agent 116 does not directly send all of the impersonation credentials (e.g., does not send all of an access key ID, secret access key and impersonation token) but instead sends proof of ownership of the credentials (e.g., sends a message based on or derived from the credentials). In embodiments only the non-secret parts of the credential are sent, proving to the Request-based Security Service that the Agent owns the secret part by computing a digital signature using the secret and sending the non-secret parts along with the digital signature (e.g., sometimes referred to as proof of bearing the credential). In one non-exhaustive example, the Request-based Security Agent 116 may use a secret access key part of the credentials to generate a digital signature based on the Signature V4 standard, or the like, and may send the signature along with the rest of the credentials (e.g., with the other access key ID and the session token).

Item 279 illustrates the authorization/Denial response from Request-based Security Service 112 for the request and item 281 illustrates that Request-based Security Agent 116 returns an indication of the authorization success or error (e.g., a denial) to the Connection-based Security Mechanism (e.g., to Authorization Component 224) (block 708). The Connection-based Security Mechanism 120 may provide the Service Logic 122 with the authorization approval/denial and the Service Logic may act accordingly, performing the operation and/or responding to the client with an indication of the success or denial (item 285).

FIG. 2, combined with FIGS. 5, 6 and 7 illustrated particular embodiments. It is contemplated that certain illustrated features may be implementation-specific and that other arrangements of features and other sequence of steps may still fall within the scope of this disclosure of impersonation of response-based security in a connection-based environment.

Client Side

FIG. 3 is combined block diagram/data flow diagrams illustrating architectures and data flows for the client side of impersonation of request-based security in a connection-based security environment, according to some embodiments. FIG. 4 is a flow chart that illustrates a technique for establishing and reauthorizing a connection between a client and a system that implements impersonation of request-based security in a connection-based security environment, according to some embodiments. The following description describes the process illustrated in FIG. 4 in the context of the client illustrated in FIG. 3.

In FIG. 2, Client Application 102 is illustrated with Request-based Security Component 106, Connection-based Security Client 108 (together, the Client-side Security Component 104) and a Client Component 110. Request-based Security Component 106 obtains request-based credentials for the client (FIG. 4, block 402). In the illustrated embodiment, the credentials may be obtained from Client Request-based Credentials Store 307. In some embodiments, the credentials may be obtained via a user interface (CLI, GUI, API) and stored in the Credential Store 307. Item 251 illustrates that the Connection-based Security Client 108 of the Client-side Security Component 104 establishes a connection 132 with Service 118 using connection credentials that are based on request-based credentials for the client (credentials from an identity and access management service of a service provider may be used, for example) (FIG. 4, block 404). Item 261 illustrates an acknowledgement to the connection request, indicating a successful connection authorization (block 406, yes), or an error (block 408). In embodiments, error handler 408 may generate and respond with an indication of an error, indicating that the connection could not be established or that authentication or authorization failed, for example.

In embodiments, the Client-side Security Component 104 knows about identity expiration and reauthorization requirement and processes them at the required time. For example, the Connection Auth/Error 261 response indicates an expiration time (e.g., an expiration for the connection and/or an expiration for the impersonation token) that triggers reauthorization (the lesser of the token lifetime or request based credential lifetime or the like). For example, the Client Application 102 may be required to cyclically re-authorize the connection using connection credentials that are based on request-based credentials for the client (block 410). In embodiments, the duration of the cycle may be based on any combination of various criteria including—but not limited to— an expiration timestamp of the impersonation credential, or an expiration timestamp of an identity of the client, etc.

The request-based credentials may be re-obtained or renewed (block 412). The connection with the connection-based service may be re-authorized using the connection credentials that are based on the request-based credentials (block 414). For a successful re-authorization (block 416, yes) the process may return to await the trigger for re-authorization (block 410). For an unsuccessful renewal attempt, (416, no) an error handler 408 may generate and respond with an indication of an error, indicating that the authentication or authorization failed, for example.

Item 271 illustrates that once the connection is established (as described above) the Client Component 110 may transmit requests over the connection 132 to the Connection-based Service 114, and item 285 illustrates the response/error that is returned by the Connection-based Service 114. A similar process, viewed from the service side, is illustrated in the bottom half of FIG. 5 (items 508, 512).

FIG. 8 is a block diagram that illustrates components of a service provider network that hosts request-based services with request-based security and a connection-based service that implements request-based security of a request-based security service that is also hosted by the service provide network, according to some embodiments. Illustrated is Connection-based Service 114 similar to Connection-based Service 114 in FIG. 1, illustrated within the context of a service provider network 800 (e.g., a cloud-based or network-based service provider). Various of the functionality depicted in FIGS. 4-7 may be performed by the Connection-based Service 114 in FIG. 8. It is contemplated that the other services illustrated in FIG. 8 (e.g., Database Service 810, Storage Service 830, Other Service(s) 820, Other Storage Service(s) 840, Compute Service(s) 850 may be implemented as either connection-based or request-based services, in various embodiments.

In some embodiments, some of the services that use request-based security use the Request-based Security Service 112 (e.g., an identity and access management service) for authorization of requests the respective services receive. Other services of the service provider network include a database service 710, storage service(s) 720, other service(s) 730, compute service(s) 740 and internal clients 102 (e.g., client applications or processes running on the service provider network that make calls on the other services, or the like).

At least some of the disclosed embodiments provide a way for connection-based services hosted in the Service Provider network 800 to use the Request-based Security Service 112.

In some embodiments, Connection-based Service 114 is a cluster-based data streaming or data processing service—open source or otherwise, although other services are contemplated, without limitation.

Also illustrated are internal and external clients 102 (some having corresponding client networks). Client Application 102 may take the form of various custom applications built using various combinations of the hosted services 112, 114, 810, 820, 830, 840, 850, etc.) or may take the form of the hosted services, in embodiments.

FIG. 9 is a block diagram that illustrates a control plane, separate a data plane, of a connection-based service that implements request-based security, according to some embodiments. FIG. 9 illustrates that clients 102a, b, . . . n can send data plane requests 909 and control plane requests 907 to the connection-based service 114. In the illustrated embodiment, the control plane functionality for the service already does work directly with the request-based security service and thus doesn't need the Request-based Security Agent 116.

In embodiments, the control plane 909 communicates directly with the Request-based Security Service 112 to authenticate and authorize control plane requests. In the illustrated embodiment the Control Plane 902 (e.g., management operations like create new cluster, scale, etc.) interacts directly with the Request-based Security Service 112 without having to go through the Request-based Security Agent 116 in the way the Data Plane 118 does. In embodiments, the Request-based Security Agent 116 is needed for the Date Plane requests 909 because the data plane doesn't directly support using the request-based security service. In some embodiments, the control plane 902 is a service provider management layer on top of another service. In embodiments, the control plane 902 and the Request-based Security Service 112 are configured such that the control plane 902 directly uses the Request-based Security Service 112 for authorizing control plane operations.

Some embodiments use the same request-based security that the control plane already uses to authorize data plane operations.

In some embodiments, the connection-based security mechanism 120 stores, based on the received authorization response for the connection, a binding of the client to the connection and generates the call to authorize the service operation at the service, wherein the call does not include the credential for authorizing the service operation. The generate the call the mechanism determines, based on the stored binding of the client application to the connection, a client ID, and includes the client ID from the stored binding in the other call to the security agent.

Some embodiments include a storage (e.g., a table or other storage mechanism) 216 for storing impersonation credentials for a plurality of connections to respective clients. The impersonation credentials are subject to respective configurable expirations and/or the impersonation credentials are obtained from the remote request-based security service that grants the impersonation credentials based on the connection credentials that are based on the request-based credentials for the clients. In some embodiments the impersonation credentials may be stored on disk (e.g., to facilitate recovery in case of failure or the like), however other forms of storage are also contemplated, without limitation (e.g., various types of RAM, ROM, volatile, non-volatile, flash memory, or the like).

In some embodiments, either the client-side security component, or the connection-based security mechanism enforces reauthorization at a time determined by the earlier of: an expiration timestamp of the impersonation credential, or an expiration timestamp of an identity of the client.

In some embodiments, the connection-based service process is a streaming data process of a managed streaming data service implemented by a cluster of instances hosted on a service provider network.

In some embodiments, the remote request-based security service is a request-based identity and access management service hosted on the service provide network that provides request-based identity and access management services for storage and compute services hosted on the service provider network that implement request-based security. In some embodiments, the request-based credentials for the client are credentials managed by the request-based identity and access management service hosted on the service provide network.

In some embodiments, the impersonation credential for the requesting client from the remote request-based security service is generated by the remote request-based security service based on authentication of credentials extracted from connection-session credentials provided during creation of the connection. The connection credentials are based on request-based credentials, managed by the remote request-based security service, for the client, in embodiments.

In embodiments, reauthorization for the client is triggered, based on: an expiration timestamp of the impersonation credential, or an expiration timestamp of an identity of the client. Reauthorization may include re-obtaining, based on the trigger, the request-based credentials for reauthorizing the client, and calling the request-based security agent to reauthorize the client based on the re-obtained request-based credentials for the client, and reauthorizing, based on receipt of an indication of reauthorization of the client for the re-obtained request-based credentials, the connection or updating the impersonation credential for the requesting client.

In embodiments, the connection-based security mechanism receives, from the requesting client, the request to establish the connection, the request comprising the connection credentials based on the request-based credentials for the requesting client. The connection-based security mechanism may generate, based on the connection credentials from the client, the call to authorize the connection and perform the call to the request-based security agent to authorize the connection and receive, from the request-based security agent, an indication of authorization or denial for the connection and respond back to the requesting client with the indicated authorization or denial for the connection, in embodiments.

The connection-based security mechanism may store, based on the received indication of authorization for the connection, a binding of the client to the connection, in embodiments. The connection-based security mechanism may generate the other call to authorize the service operation at the service, wherein the call does not include the credential for authorizing the service operation. Generate may include determine, based on the stored binding of the client to the connection, a client ID, and include the client ID from the stored binding in the other call to the security agent.

The security agent may generate the call to the remote request-based security service to authorize the requested service operation. Generation may include identifying, based on the client ID in the other call to authorize the service operation from the connection-based security mechanism, a corresponding stored impersonation credential, and including the impersonation credential in the call to the remote request-based security service to authorize the requested service operation, in embodiments.

In embodiments, the connection-based security mechanism may, in response to a call to authorize another service operation, wherein the call to authorize the other service operation does not include a credential for authorizing the other service operation, check a local cache of stored permissions, wherein the stored permissions were obtained using impersonation tokens at the request-based security service, and respond to the call to authorize the other service operation with approval or denial of the authorization, based on the check.

Example Computer System

FIG. 10 is a block diagram that illustrates an example of a computer system, one or more of which may implement various components described and illustrated throughout the disclosure, including one or more components that implement client-side or server-side implementation of impersonation of request-based security in a connection-based security environment, according to embodiments.

Various portions of systems in FIGS. 1, 2, 3, 8 and 9 and/or methods presented in FIGS. 4-7, described herein, may be executed on one or more computer systems similar to that described herein, which may interact with various other devices of the system.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1060, such as cursor control device, keyboard, audio device, and display(s). In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for an Identity and Access Management Service that implements persistent source values for assumed alternative identities may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for an Identity and Access Management Service that implements persistent source values for assumed alternative identities, are shown stored within system memory 1020 as Connection-based Service Code 114 and data 1026 (e.g., the policies, etc.), respectively. In some embodiments (not illustrated), the Code 114 may be the client-side code). In other embodiments, program instructions and/or data may be received, sent, or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to any of the FIGS.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 1000 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions (e.g., such as code 114), configured to implement embodiments of impersonation of request-based security in a connection-based security environment as described herein, and data storage 1026, comprising various data accessible by the program instructions 114. In one embodiment, program instructions 114 may include software elements of a method illustrated in the above figures. Data storage 1026 may include data that may be used in embodiments described herein. In other embodiments, other or different software elements and/or data may be included.

Those skilled in the art will appreciate that computer system 1000 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., persistent source values for assumed alternative identities) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

What is claimed is:

1. A system, comprising:
   one or more computers comprising one or more respective processors and memory and configured to implement a connection-based security mechanism of a connection-based service process, and to implement a request-based security agent;
   the connection-based security mechanism configured to:
      receive a connection authorization request for a connection from a client including connection credentials based on request-based credentials for the client;
      call the request-based security agent to authorize the connection using the connection credentials based on request-based credentials for the client;
      receive a request to authorize a service operation requested by the client over the connection without credentials for the requested service operation; and
      call the request-based security agent to authorize the service operation, the call including an indication of the client and the requested service operation;
   the request-based security agent configured to:
      in response to the call from the connection-based security mechanism to authorize the connection, call a remote request-based security service to authorize the connection using the connection credentials based on request-based credentials for the client;
      receive an authorization response and impersonation credential for the client from the remote request-based security service;
      store the impersonation credential and associate the impersonation credential with the client; and
      in response to the call from the connection-based security mechanism to authorize the service operation, lookup the impersonation credential for the client and use the impersonation credential to call the remote request-based security service to authorize the requested service operation.

2. The system of claim 1, wherein the connection-based security mechanism is configured to:

store, based on the received authorization response for the connection, a binding of the client to the connection;
generate the call to authorize the service operation at the service, wherein the call does not include the credential for authorizing the service operation, wherein said generate comprises:
  determine, based on the stored binding of the client to the connection, a client ID, and
  include the client ID from the stored binding in the other call to the security agent.

3. The system of claim 1, further comprising:
storage for storing impersonation credentials for a plurality of connections to respective clients;
wherein the impersonation credentials are subject to respective configurable expirations, the impersonation credentials obtained from the remote request-based security service configured to grant the impersonation credentials based on the connection credentials that are based on the request-based credentials for the clients; and
wherein the connection-based security mechanism is configured to enforce reauthorization at a time determined by the earlier of:
  an expiration timestamp of the impersonation credential, or
  an expiration timestamp of an identity of the client.

4. The system of claim 1,
wherein the connection-based service process comprises a streaming data process of a managed streaming data service implemented by a cluster of instances hosted on a service provider network; and
wherein the remote request-based security service comprises a request-based identity and access management service hosted on the service provide network that provides request-based identity and access management services for storage and compute services hosted on the service provider network that implement request-based security; and
wherein the request-based credentials for the client are credentials managed by the request-based identity and access management service hosted on the service provide network.

5. A method, comprising:
performing by one or more computing devices:
  calling, by a request-based security agent and in response to a call from a connection-based security mechanism to authorize a connection on behalf of a requesting client, a remote request-based security service to authorize the connection using connection credentials based on request-based credentials for the requesting client;
  receiving, by the request-based security agent, an authorization response and impersonation credential for the requesting client from the remote request-based security service;
  storing, by the request-based security agent, the impersonation credential and associating the impersonation credential with the client; and
  in response to another call from the connection-based security mechanism to authorize a service operation at a service,
    calling, by the security agent, the remote request-based security service to authorize, based on the impersonation credential, the requested service operation.

6. The method of claim 5, wherein the impersonation credential for the requesting client from the remote request-based security service is generated by the remote request-based security service based on authentication of credentials extracted from connection-session credentials provided during creation of the connection, wherein the connection credentials are based on request-based credentials, managed by the remote request-based security service, for the client.

7. The method of claim 5, further comprising:
receiving, by the connection-based security mechanism, another connection authorization request for another connection from another client including connection credentials based on request-based credentials for the other client;
calling, by the connection-based security mechanism, the request-based security agent to authorize the other connection using the connection credentials based on request-based credentials for the other client;
receiving, by the connection-based security mechanism, a request to authorize another service operation requested by the other client over the other connection without credentials for the requested service operation;
calling, by the connection-based security mechanism, the request-based security agent to authorize the other service operation, the call including an indication of the other client and the requested other service operation; and
responding to the request to authorize the other service operation, based on receipt of authorization of the other service operation from the request-based security agent, with authorization for the service operation.

8. The method of claim 5, further comprising:
triggering reauthorization for the client, based on:
  an expiration timestamp of the impersonation credential, or
  an expiration timestamp of an identity of the client;
re-obtaining, based on the trigger, the request-based credentials for reauthorizing the client;
calling the request-based security agent to reauthorize the client based on the re-obtained request-based credentials for the client; and
reauthorizing, based on receipt of an indication of reauthorization of the client for the re-obtained request-based credentials, the connection or updating the impersonation credential for the requesting client.

9. The method of claim 5, further comprising:
hosting, by one or more instances of a cluster of instances of a service provider network, the request-based security agent and the connection and the connection-based security mechanism.

10. The method of claim 5, wherein the connection-based security mechanism is configured to perform:
receiving, from the requesting client, the request to establish the connection, the request comprising the connection credentials based on the request-based credentials for the requesting client;
generating, based on the connection credentials from the client, the call to authorize the connection;
performing the call to the request-based security agent to authorize the connection;
receiving, from the request-based security agent, an indication of authorization or denial for the connection; and
responding back to the requesting client with the indicated authorization or denial for the connection.

11. The method of claim 10, wherein the connection-based security mechanism is configured to perform:
storing, based on the received indication of authorization for the connection, a binding of the client to the connection.

12. The method of claim 11, wherein the connection-based security mechanism is configured to perform:
generating the other call to authorize the service operation at the service, wherein the call does not include the credential for authorizing the service operation, wherein said generating comprises:
determining, based on the stored binding of the client to the connection, a client ID; and
including the client ID from the stored binding in the other call to the security agent.

13. The method of claim 12, further comprising:
generating, by the security agent, the call to the remote request-based security service to authorize the requested service operation, wherein said generating comprises:
identifying, based on the client ID in the other call to authorize the service operation from the connection-based security mechanism, a corresponding stored impersonation credential; and
including the impersonation credential in the call to the remote request-based security service to authorize the requested service operation.

14. The method of claim 5, further comprising:
in response to a call to authorize another service operation, wherein the call to authorize the other service operation does not include a credential for authorizing the other service operation,
checking, by the connection-based security mechanism, a local cache of stored permissions, wherein the stored permissions were obtained using impersonation tokens at the request-based security service; and
responding to the call to authorize the other service operation with approval or denial of the authorization, based on the checking.

15. One or more non-transitory computer-readable storage media storing program instructions that when executed on or across one or more processors cause the one or more processors to implement a connection-based security mechanism configured to perform:
calling, by a request-based security agent and in response to a call from a connection-based security mechanism to authorize a connection on behalf of a requesting client, a remote request-based security service to authorize the connection using connection credentials based on request-based credentials for the requesting client;
receiving, by the request-based security agent, an authorization response and impersonation credential for the requesting client from the remote request-based security service;
storing, by the request-based security agent, the impersonation credential and associating the impersonation credential with the client; and
in response to another call from the connection-based security mechanism to authorize a service operation at a service, wherein the call does not include a credential for authorizing the service operation,
calling, by the security agent, the remote request-based security service to authorize, based on the impersonation credential, the requested service operation.

16. The one or more non-transitory computer-readable storage media of claim 15, storing program instructions that configure the connection-based security mechanism to perform:
receiving, from the requesting client, the request to establish the connection, the request comprising the connection credentials based on the request-based credentials for the requesting client;
generating, based on the connection credentials from the client, the call to authorize the connection;
performing the call to the request-based security agent to authorize the connection;
receiving, from the request-based security agent, an indication of authorization or denial for the connection; and
responding back to the requesting client with the indicated authorization or denial for the connection.

17. The one or more non-transitory computer-readable storage media of claim 16, storing program instructions that configure the connection-based security mechanism to perform:
storing, based on the received indication of authorization for the connection, a binding of the client to the connection.

18. The one or more non-transitory computer-readable storage media of claim 17, storing program instructions that configure the connection-based security mechanism configured to perform generating the other call to authorize the service operation at the service, wherein the call does not include the credential for authorizing the service operation, wherein said generating comprises:
determining, based on the stored binding of the client to the connection, a client ID; and
including the client ID from the stored binding in the other call to the security agent.

19. The one or more non-transitory computer-readable storage media of claim 18, storing program instructions that configure the security agent to perform generating the call to the remote request-based security service to authorize the requested service operation, wherein said generating comprises:
identifying, based on the client ID in the other call to authorize the service operation from the connection-based security mechanism, a corresponding stored impersonation credential; and
including the impersonation credential in the call to the remote request-based security service to authorize the requested service operation.

20. The one or more non-transitory computer-readable storage media of claim 15, storing program instructions that configure the connection-based security mechanism to perform, in response to a call to authorize another service operation, wherein the call to authorize the other service operation does not include a credential for authorizing the other service operation:
checking a local cache of stored permissions, wherein the stored permissions were obtained using impersonation tokens at the request-based security service; and
responding to the call to authorize the other service operation with approval or denial of the authorization, based on the checking.

* * * * *